(12) United States Patent  
Park et al.

(10) Patent No.: US 8,958,180 B1
(45) Date of Patent: Feb. 17, 2015

(54) CAPPING MATERIALS FOR MAGNETIC READ HEAD SENSOR

(71) Applicant: HGST Netherlands B.V., Amsterdam (NL)

(72) Inventors: Chando Park, Palo Alto, CA (US); Zheng Gao, San Jose, CA (US); Sangmun Oh, Palo Alto, CA (US); Susumu Okamura, San Jose, CA (US); James Mac Freitag, Sunnyvale, CA (US)

(73) Assignee: HGST Netherlands, B.V., Amsterdam (NL)

( * ) Notice: Subject to any disclaimer, the term of this patent is extended or adjusted under 35 U.S.C. 154(b) by 0 days.

(21) Appl. No.: 14/012,595

(22) Filed: Aug. 28, 2013

(51) Int. Cl.  
*G11B 5/39* (2006.01)

(52) U.S. Cl.  
USPC ......................................... 360/319

(58) Field of Classification Search  
USPC ........................................ 360/324.12  
See application file for complete search history.

(56) References Cited

U.S. PATENT DOCUMENTS

| 6,760,198 | B2 | 7/2004 | Jarratt |
| 7,009,822 | B1 | 3/2006 | Gill et al. |
| 8,194,365 | B1 | 6/2012 | Leng et al. |
| 8,270,125 | B2 | 9/2012 | Gill |
| 8,337,676 | B2 | 12/2012 | Zhao et al. |
| 8,472,151 | B2 * | 6/2013 | Wang et al. ............... 360/324.12 |
| 8,498,084 | B1 * | 7/2013 | Leng et al. ................. 360/324.2 |
| 2010/0006960 | A1 | 1/2010 | Horng et al. |

FOREIGN PATENT DOCUMENTS

| EP | 1607980 A2 | 12/2005 |
| EP | 1885006 A1 | 2/2008 |
| EP | 1968130 A2 | 9/2008 |

OTHER PUBLICATIONS

Yen et al.; Improvement of Switching Field in Magnetic Tunneling Junction Using Ru/Ta Capping Layer': Electronics Research and Service Organization (ERSO), Industrial Technology Research Institute (ITRI), Hsinchu 310, Taiwan; IEEE Transactions on Magnetics, Vol. 42, No. 10, Oct. 2006, 3 pages.

Nagamine et al.; "Conceptual Material Design for Magnetic Tunneling Junction Cap Layer for High Magnetoresistance Ratio"; Proceedings of the 50th Annual Conference on Magnetism and Magnetic Materials; Apr. 2006, 3 pages.

* cited by examiner

*Primary Examiner* — Mark Blouin  
(74) *Attorney, Agent, or Firm* — Patterson & Sheridan, LLP

(57) ABSTRACT

Embodiments of the present invention generally relate to a magnetic head having a sensor structure comprising a pinned layer, a spacer layer, a free layer and a capping structure. The free layer has a topmost layer comprising CoB and the capping structure comprises an X layer, where X is an element such as Hf, Zr, Ti, V, Nb, or Ta.

18 Claims, 3 Drawing Sheets

CAPPING MATERIALS FOR MAGNETIC READ HEAD SENSOR

BACKGROUND

1. Field

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

As the areal storage density in hard disk drives (HDDs) increases, the demand for greater magnetoresistive (MR) ratio and reduction of shield to shield distance has increased. Since high enough MR using MgO barrier based magnetic tunnel junction (MTJ) has been obtained, the reduction of shield to shield distance, or read gap to increase the spatial resolution along the track and magnetic parameters such as free layer magnetostriction, anisotropy and damping constant are becoming important factors in order to meet the required high storage density.

Therefore, there is a need in the art for a magnetic head having a reduced read gap and improved magnetostriction and damping constant.

SUMMARY OF THE INVENTION

Embodiments of the present invention generally relate to a magnetic head having a sensor structure comprising a pinned layer, a spacer layer, a free layer and a capping structure. The free layer has a topmost layer comprising CoB and the capping structure comprises an X layer adjacent to CoB layer, where X is an element such as Hf, Zr, Ti, V, Nb, or Ta etc.

In one embodiment, a magnetic head is disclosed. The magnetic head comprises a first shield layer and a sensor structure disposed over a first portion of the first shield layer. The sensor structure has sidewalls and the sensor structure comprises a pinned layer disposed over the first shield layer, a spacer layer disposed over the pinned layer, and a free layer disposed over the spacer layer. The free layer comprises at least two layers and the topmost layer comprises CoB. The sensor structure further comprises a capping structure disposed on the free layer. The capping structure comprises an X layer disposed over the CoB free layer. X comprises an element selected from the group consisting of Hf, Zr, Ti, V, Nb, and Ta etc. The magnetic head further comprises a bias layer disposed over a second portion of the first shied layer and over the sidewalls of the sensor structure, and a second shield layer disposed over the bias layer and the sensor structure.

In another embodiment, a magnetic head is disclosed. The magnetic head comprises a first shield layer and a sensor structure disposed over a first portion of the first shield layer. The sensor structure has sidewalls and the sensor structure comprises a pinned layer disposed over the first shield layer, a spacer layer disposed over the pinned layer, and a free layer disposed over the spacer layer. The free layer comprises at least two layers and the topmost layer comprises CoB. The sensor structure further comprises a capping structure disposed on the free layer. The capping structure comprises an X layer disposed over the CoB free layer. X comprises an element selected from the group consisting of Hf, Zr, Ti, V, Nb, and Ta. The magnetic head further comprises an insulation layer disposed over a second portion of the first shied layer and over the sidewalls of the sensor structure, a bias layer disposed over the insulation layer, a bias capping structure disposed over the bias layer, and a second shield layer disposed over the bias capping structure, the bias layer, the insulation layer and the sensor structure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a magnetic head having a sensor structure comprising a pinned layer, a spacer layer, a free layer and a capping structure. The free layer has a topmost layer comprising CoB and the capping structure comprises an X layer, where X is an element such as Hf, Zr, Ti, V, Nb, or Ta.

Figure 1:
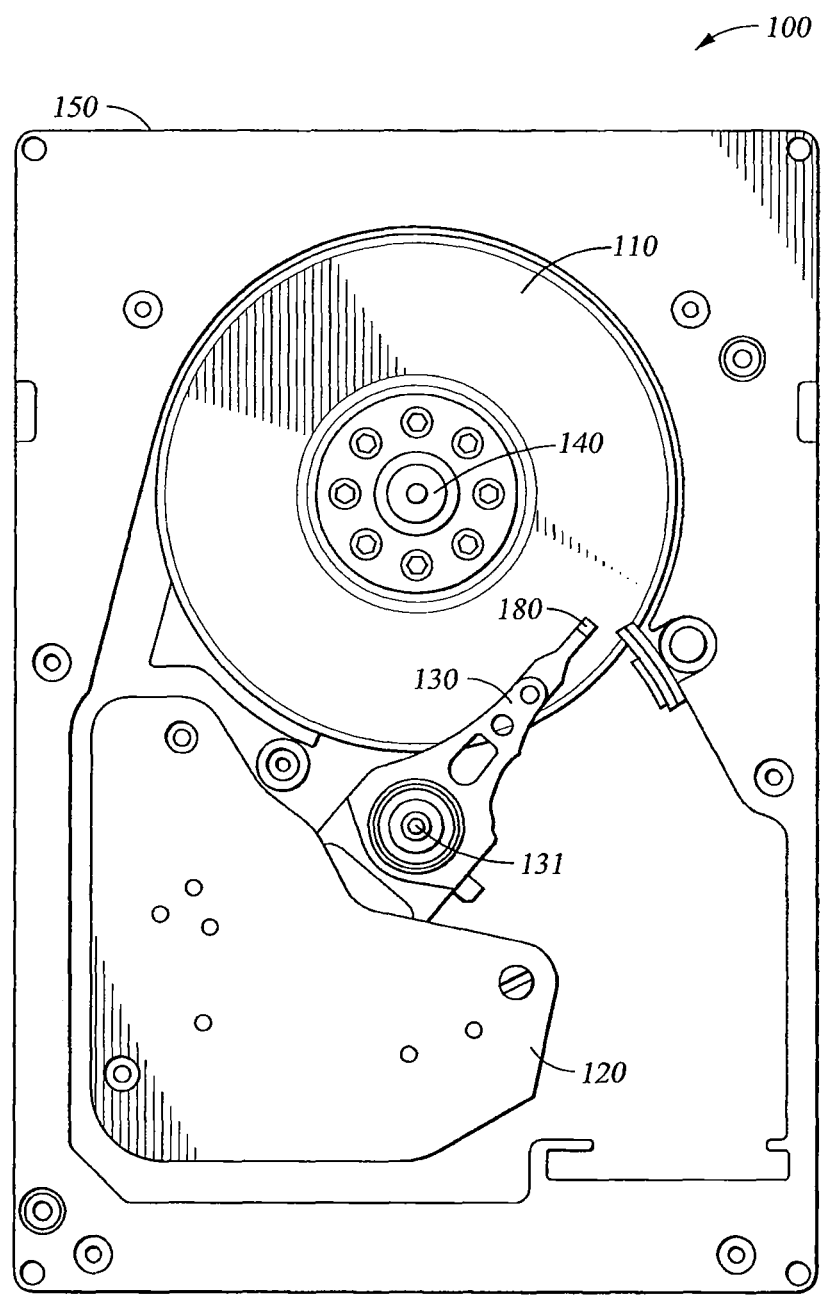
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2A:
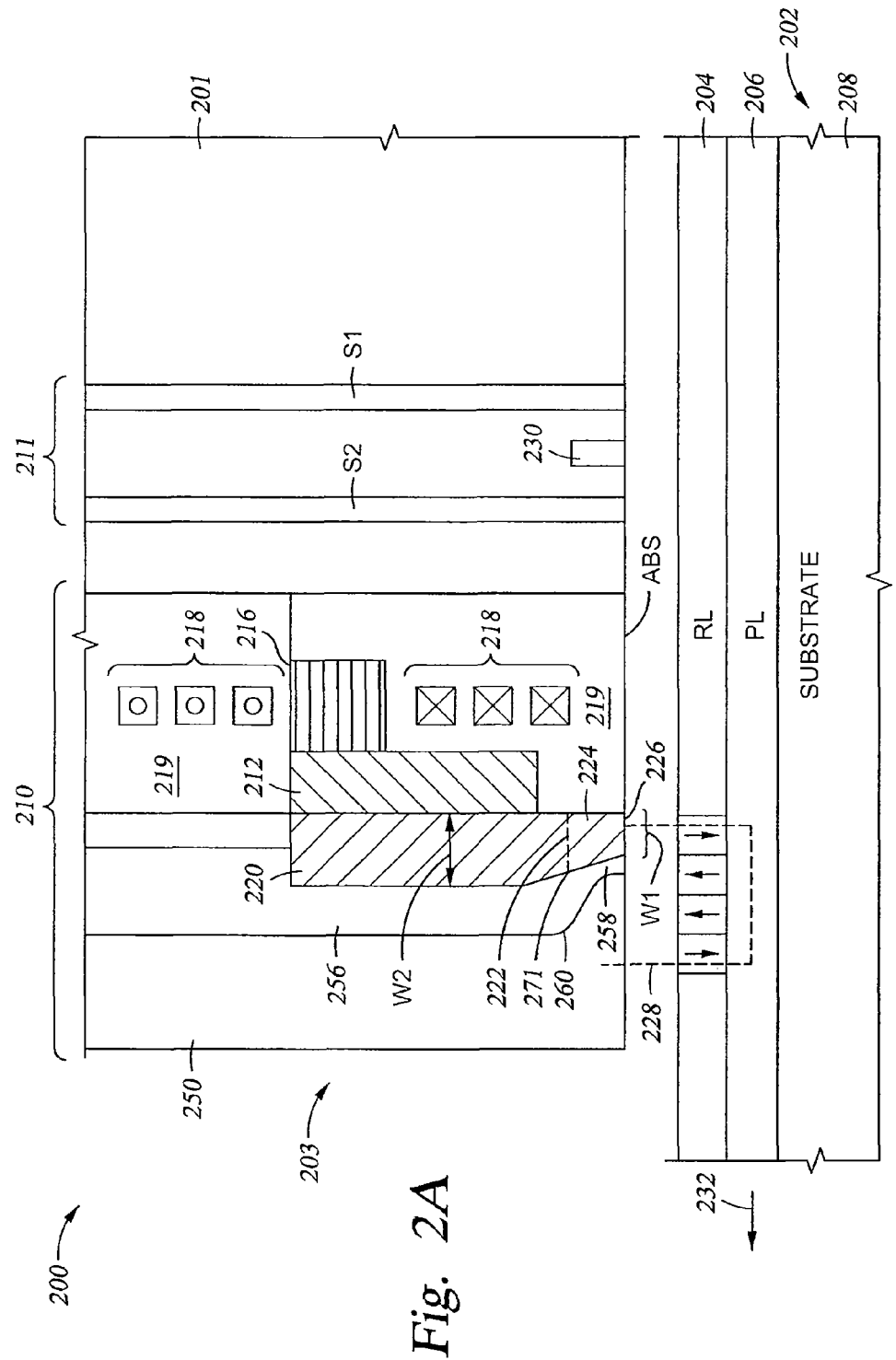
FIG. 2A is a side view of a read/write head and magnetic disk of the disk drive of FIG. 1, according to one embodiment of the invention.

FIG. 2A is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a MR read head that includes an MR sensing element 230 located between MR shields S1 and S2. In other embodiments, the magnetic read head 211 is a MTJ read head that includes a MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2A, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 2B:
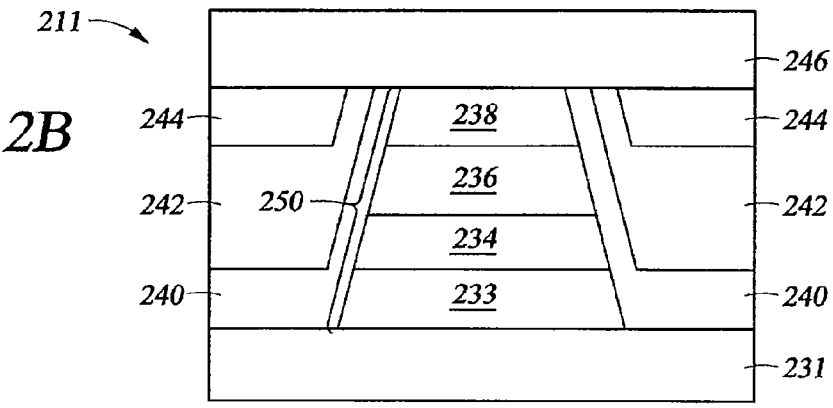
FIG. 2B is a schematic cross-sectional view of portions of a magnetic head according to one embodiment of the invention.

FIG. 2B is a schematic cross-sectional view of portions of magnetic head 211 according to one embodiment. The thickness of each layer, and the width of each layer, are for example only, and each layer may be thicker/thinner and/or wider/narrower. The magnetic head 211 includes a first shield layer 231. The first shield layer 231 may comprise a ferromagnetic material. Suitable ferromagnetic materials that may be utilized include Ni, Fe, Co, NiFe, NiFeCo, NiCo, CoFe and combinations thereof.

The magnetic head 211 also includes a sensor structure 250 comprising a pinned magnetic layer 233, a spacer layer 234, a free layer 236 and a sensor capping structure 238. The pinned magnetic layer 233 may be one of several types of pinned layers, such as a simple pinned, antiparallel pinned, self pinned or antiferromagnetic pinned sensor. For purposes of simplicity, the sensor will be described herein as a self pinned sensor having a first pinned layer, a second pinned layer, and a non magnetic layer, such as Ru sandwiched therebetween. The first and second pinned layers can be constructed of several magnetic materials such as, for example NiFe, CoFe, CoFeB, or diluted magnetic alloys etc. The spacer layer 234 may comprise an insulating material such as MgO or alumina or a metal layer such as Cu, Ag or AgSn etc. The free layer 236 and the sensor capping structure 238 are described in detail below.

Following the formation of the sensor structure 250, an insulating layer 240 may be deposited on the first shield layer 231 as well as the sidewalls of the sensor structure 250. The insulating layer 240 may comprise an insulating material such as aluminum oxide or silicon nitride etc. The insulating layer 240 may be deposited by well known deposition methods such as atomic layer deposition (ALD), chemical vapor deposition (CVD), ion beam sputtering (IBD), etc. After the insulating layer 240 is deposited, a bias layer 242 is then deposited. The bias layer 242 may comprise a single or laminated magnetic materials such as CoPt, high moment CoFe or NiFe etc.

Once the bias layer 242 is deposited, a bias capping structure 244 may be formed over the bias layer 242. In one embodiment, the bias capping structure 244 may comprise a multiple layered structure comprising one or combination of a tantalum layer, an iridium layer, a chromium layer, a titanium layer and a ruthenium layer. A second shield layer 246 is deposited over the bias capping structure 244, the bias layer 242, the insulating layer 240, and the sensor capping structure 238. The second shield layer 246 may comprise a ferromagnetic material. Suitable ferromagnetic materials that may be utilized include Ni, Fe, Co, NiFe, NiFeCo, NiCo, CoFe and combinations thereof.

Figure 3A:
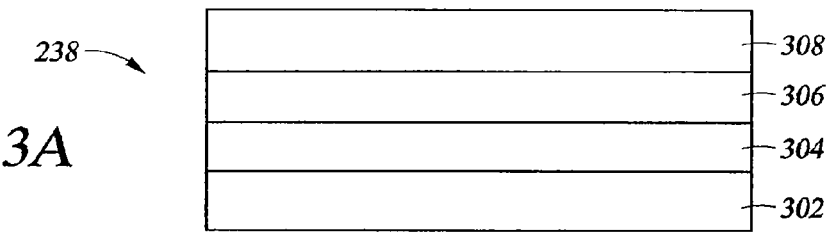
FIG. 3A is a schematic cross-sectional view of a capping structure according to one embodiment of the invention.

FIG. 3A is a schematic cross-sectional view of the sensor capping structure 238 according to one embodiment of the invention. The capping structure 238 comprises a hafnium layer 302, a first ruthenium layer 304 disposed over the hafnium layer 302, a tantalum layer 306 disposed over the first ruthenium layer 304, and a second ruthenium layer 308 disposed over the tantalum layer 306. The hafnium layer 302 and the first ruthenium layer 304 may have a combined thickness of about 15 Angstroms. The tantalum layer 306 may have a thickness of about 15 Angstroms and the second ruthenium layer 308 may have a thickness of about 50 Angstroms.

Figure 3B:
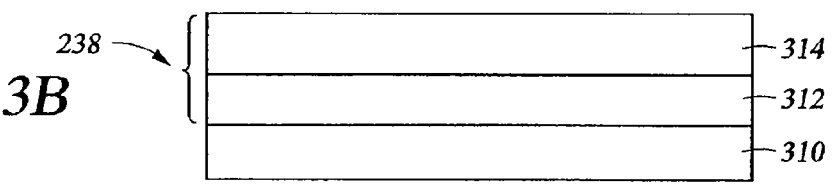
FIG. 3B is a schematic cross-sectional view of a capping structure according to one embodiment of the invention.

FIG. 3B is a schematic cross-sectional view of the sensor capping structure 238 according to another embodiment of the invention. The capping structure 238 comprises a first capping layer 312 and a second capping layer 314. The first capping layer 312 may be an element such as hafnium, zirconium, titanium, vanadium, niobium, or tantalum. The second capping layer 314 may be a single layer or a multi-layer structure. The second capping layer 314 functions as a milling buffer and is also used to prevent oxidation during post sensor processes. In one embodiment, the second capping layer 314 comprises a first ruthenium layer, a tantalum layer, and a second ruthenium layer, which is similar to the layers 304, 306 and 308 described in FIG. 3A.

An intermixing layer 310 is formed as the first capping layer 312 is deposited on the topmost layer of the free layer 236 (described in detail below), and the intermixing layer 310 has a thickness ranging from about 4 Angstroms to about 6 Angstroms. In one embodiment, the first capping layer 312 comprises hafnium and the intermixing layer 310 comprises CoHf.

Figure 4A:
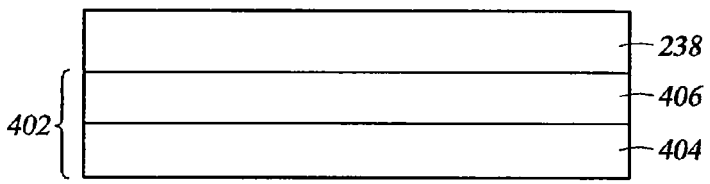
FIG. 4A is a schematic cross-sectional view of a portion of a sensor structure of the magnetic head of FIG. 2B according to one embodiment of the invention.

FIG. 4A is a schematic cross-sectional view of a portion of the sensor structure 250 of the magnetic head 211 according to one embodiment. As shown in FIG. 4A, a free layer 402, which may be the free layer 236 described in FIG. 2B, comprises a first magnetic layer 404 and a second magnetic layer 406. The first magnetic layer 404 may comprise Co, Fe, or combinations thereof. In one embodiment, the first magnetic layer 404 comprises $Co_xFe_{100-x}$, where x is a positive integer less than 100. The first magnetic layer 404 may comprise multiple layers of CoFe, where each CoFe layer has a different iron atomic content ranging from zero to 100%. The second magnetic layer 406 may comprise Co, Fe, B, or combinations thereof. In one embodiment, the second magnetic layer 406 comprises $Co_xFe_{80-x}B_{20}$, where x is a positive integer less than 80. The second magnetic layer 406 has a different composition as the first magnetic layer 404. In one embodiment, the second magnetic layer 406 comprises CoB. The capping structure 238 as described in FIG. 3A or 3B is disposed over the free layer 402.

The first magnetic layer 404 has high spin polarization, high moment and positive magnetostriction. The second magnetic layer 406 has a negative magnetostriction, so the overall magnetostriction is near zero. The hafnium layer 302 or the first capping layer 312 in the capping structure 238 is deposited at the interface between the free layer 402 and the capping structure 238. Consequently, magnetostriction is reduced due to boron diffusion out of the second magnetic layer 406 and the formation of the intermixing layer 310 at the interface. With the second magnetic layer 406 and the capping structure 238, the free layer 402 has equivalent magnetic and electrical performances while having a reduced thickness that results in reader gap reduction which is desired for bit error rate improvement. The free layer 402 may have a thickness of about 50 Angstroms, which is about 15 to 20 Angstroms less than the thickness of conventional multilayer free layer having a conventional capping structure disposed thereon while with equivalent magnetic and electrical performance. In the embodiment where the second magnetic layer 406 is CoB, the boron in the CoB layer 406 diffuses from the free layer 402 to the hafnium layer 302 or the first capping layer 312. Such diffusion leaves the CoB layer 406 more Co dominant, which leads to the free layer 402 having negative magnetostriction.

In addition, hafnium has low Young's modulus (i.e., less stiff), compared to ruthenium or tantalum in a conventional capping layer. A stiff capping layer having high Young's modulus may prevent the second magnetic layer of a two-layered free layer from expanding, causing the first magnetic layer having positive magnetostriction to become dominant for total magnetostriction. Thus, to maximize negative magnetostriction from the second magnetic layer, a material having low Young's modulus may be used. The hafnium layer 302 in the capping structure 238 has a Young's modulus of about 78 N/m², while ruthenium and tantalum have a Young's modulus of about 414 N/m² and 186 N/m², respectively.

The hafnium layer 302 in the capping structure 238 also reduces the spin pumping effect, resulting in a low free layer damping constant, which may lead to better device performance due to potential noise reduction and a gain in signal to noise ratio (SNR).

Figure 4B:
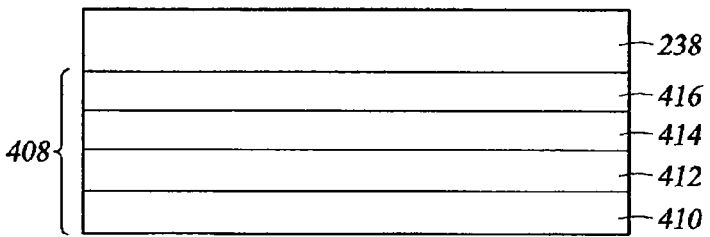
FIG. 4B is a schematic cross-sectional view of a portion of a sensor structure of the magnetic head of FIG. 2B according to one embodiment of the invention.

FIG. 4B is a schematic cross-sectional view of a portion of the sensor structure 250 of the magnetic head 211 according to one embodiment. As shown in FIG. 4B, a free layer 408, which may be the free layer 236 described in FIG. 2B, comprises a first magnetic layer 410, a second magnetic layer 412, a blocking layer 414, and a third magnetic layer 416. The first magnetic layer 410 may comprise Co, Fe, or combinations thereof. In one embodiment, the first magnetic layer 410 comprises $Co_xFe_{100-x}$, where x is a positive integer less than 100. The second magnetic layer 412 may comprise Co, Fe, B, or combinations thereof. In one embodiment, the second magnetic layer 412 comprises $Co_xFe_{80-x}B_{20}$, where x is a positive integer less than 80. The blocking layer 414 may comprise an amorphous diluted magnetic or non-magnetic material such as Hf, Zr or Ta doped alloy. The third magnetic layer 416 may comprise Ni, Fe, or combinations thereof. In one embodiment, the third magnetic layer 416 comprises $Ni_xFe_{100-x}$, where x is a positive integer less than 100. The capping structure 238 as described in FIG. 3 is disposed over the free layer 408.

With the four layered free layer 408, the first and second magnetic layers 410, 412 have positive magnetostriction and the third magnetic layer 416 has negative magnetostriction. As described above, the hafnium layer 302 in the capping structure 238 may help in reducing magnetostriction and damping constant.

In summary, a sensor structure in a magnetic head is disclosed. The sensor structure has a free layer with a topmost layer comprised of CoB. A capping structure is disposed on the free layer and an intermixing layer is formed at the interface between the CoB layer and the capping structure. The bottom layer of the capping structure disposed over the free layer comprises an element such as Hf, Zr, Ti, V, Nb, or Ta. The CoB free layer, intermixing layer and the bottom layer of the capping structure causes the free layer to have a negative magnetostriction.

While the foregoing is directed to embodiments of the present invention, other and further embodiments of the invention may be devised without departing from the basic scope thereof, and the scope thereof is determined by the claims that follow.

What is claimed is:

1. A magnetic head, comprising:
   a first shield layer;
   a sensor structure disposed over a first portion of the first shield layer, wherein the sensor structure has sidewalls and the sensor structure comprises:
      a pinned layer disposed over the first shield layer;
      a spacer layer disposed over the pinned layer;
      a free layer disposed over the spacer layer, wherein the free layer comprises at least two layers and the topmost layer comprises CoB; and
      a capping structure disposed on the free layer, wherein the capping structure comprises an X layer disposed over the free layer, wherein X comprises an element selected from the group consisting of Hf, Zr, Ti, V, and Nb;
   a bias layer disposed over a second portion of the first shield layer and over the sidewalls of the sensor structure; and
   a second shield layer disposed over the bias layer and the sensor structure.

2. The magnetic head of claim 1, wherein the free layer has a negative magnetostriction.

3. The magnetic head of claim 1, wherein the free layer comprises a first magnetic layer and a second magnetic layer.

4. The magnetic head of claim 3, wherein the free layer has a thickness of about 50 Angstroms.

5. The magnetic head of claim 4, wherein the first magnetic layer comprises a material selected from the group consisting of Co, Fe, and combinations thereof.

6. The magnetic head of claim 5, wherein the second magnetic layer comprises CoB.

7. The magnetic head of claim 6, further comprising an intermixing layer disposed between the free layer and the capping structure, wherein the intermixing layer comprises CoX and has a thickness ranging from about 4 Angstroms to about 6 Angstroms.

8. The magnetic head of claim 1, wherein the capping structure further comprises a first Ru layer, a Ta layer, and a second Ru layer.

9. The magnetic head of claim 8, wherein the first Ru layer is disposed on the X layer, the Ta layer is disposed on the first Ru layer, and the second Ru layer is disposed on the Ta layer.

10. A magnetic head, comprising:
    a first shield layer;
    a sensor structure disposed over a first portion of the first shield layer, wherein the sensor structure has sidewalls and the sensor structure comprises:
       a pinned layer disposed over the first shield layer;
       a spacer layer disposed over the pinned layer;
       a free layer disposed over the spacer layer, wherein the free layer comprises at least two layers and the topmost layer comprises CoB; and
       a capping structure disposed on the free layer, wherein the capping structure comprises an X layer disposed over the free layer, wherein X comprises an element selected from the group consisting of Hf, Zr, Ti, V, Nb, and Ta;
    an insulation layer disposed over a second portion of the first shield layer and over the sidewalls of the sensor structure;
    a bias layer disposed over the insulation layer;
    a bias capping structure disposed over the bias layer; and
    a second shield layer disposed over the bias capping structure, the bias layer, the insulation layer and the sensor structure, wherein the second shield layer is contact with the bias layer.

11. The magnetic head of claim 10, wherein the free layer has a negative magnetostriction.

12. The magnetic head of claim 10, wherein the free layer comprises a first magnetic layer and a second magnetic layer.

13. The magnetic head of claim 12, wherein the free layer has a thickness of about 50 Angstroms.

14. The magnetic head of claim 13, wherein the first magnetic layer comprises a material selected from the group consisting of Co, Fe, and combinations thereof.

15. The magnetic head of claim 14, wherein the second magnetic layer comprises CoB.

16. The magnetic head of claim 15, further comprising an intermixing layer disposed between the free layer and the capping structure, wherein the intermixing layer comprises CoX and has a thickness ranging from about 4 Angstroms to about 6 Angstroms.

17. The magnetic head of claim 10, wherein the capping structure further comprises a first Ru layer, a Ta layer, and a second Ru layer.

18. The magnetic head of claim 17, wherein the first Ru layer is disposed on the X layer, the Ta layer is disposed on the first Ru layer, and the second Ru layer is disposed on the Ta layer.

* * * * *